(12) United States Patent
Knebel et al.

(10) Patent No.: US 7,477,380 B2
(45) Date of Patent: Jan. 13, 2009

(54) SCANNING MICROSCOPE COMPRISING A CONFOCAL SLIT SCANNER FOR IMAGING AN OBJECT

(75) Inventors: Werner Knebel, Kronau (DE); Holger Birk, Meckesheim (DE); Rafael Storz, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 96 days.

(21) Appl. No.: 10/537,335

(22) PCT Filed: Sep. 23, 2003

(86) PCT No.: PCT/DE03/03163

§ 371 (c)(1),
(2), (4) Date: Oct. 17, 2005

(87) PCT Pub. No.: WO2004/051341

PCT Pub. Date: Jun. 17, 2004

(65) Prior Publication Data

US 2006/0152787 A1     Jul. 13, 2006

(30) Foreign Application Priority Data

Dec. 5, 2002    (DE) ................................. 102 57 120

(51) Int. Cl.
*G01J 3/28*    (2006.01)
(52) U.S. Cl. ...................................... 356/326; 356/317
(58) Field of Classification Search ................. 356/317, 356/326
See application file for complete search history.

(56) References Cited

U.S. PATENT DOCUMENTS

| | | | |
|---|---|---|---|
| 5,192,980 A | 3/1993 | Dixon et al. | 356/326 |
| 5,866,911 A * | 2/1999 | Baer | 250/458.1 |
| 6,510,001 B1 * | 1/2003 | Engelhardt et al. | 359/385 |

(Continued)

FOREIGN PATENT DOCUMENTS

DE    43 30 347    3/1995

(Continued)

OTHER PUBLICATIONS

International Search Report for International Application No. PCT/DE2003/003163 (3 pages).

(Continued)

*Primary Examiner*—Kara E Geisel
(74) *Attorney, Agent, or Firm*—Darby & Darby (57) ABSTRACT

A scanning microscope for imaging an object includes a light source and a spectrally selective detection device. An illumination beam path extends from the light source to the object. A detection beam path extends from the object to the detection device. A spectrally selective element useable to select light from the light source is provided. The spectrally selective element is useable to mask out of the detection beam path the selected light from the light source reflected or scattered on the object. An illumination slit diaphragm is disposed in the illumination beam path and configured to generate a linear illumination pattern in a region of the object. A detection slit diaphragm is disposed in the detection beam path and configured to detect the light coming from the linear illumination region from a focal plane so as to provide a confocal slit scanner.

18 Claims, 6 Drawing Sheets

U.S. PATENT DOCUMENTS

| | | | |
|---|---|---|---|
| 6,555,811 B1* | 4/2003 | Amos | 250/234 |
| 6,809,815 B2 | 10/2004 | Knebel | 356/308 |
| 2002/0163717 A1 | 11/2002 | Lee | |
| 2002/0180965 A1* | 12/2002 | Engelhardt et al. | 356/318 |
| 2003/0006368 A1* | 1/2003 | Engelhardt et al. | 250/234 |

FOREIGN PATENT DOCUMENTS

| | | |
|---|---|---|
| DE | 199 02 625 | 9/1999 |
| DE | 199 06 757 | 12/1999 |
| DE | 100 38 049 A1 | 2/2002 |
| EP | 1 178 345 | 2/2002 |
| JP | 2000314839 | 11/2000 |
| WO | WO 95/07447 | 3/1995 |
| WO | WO-02082025 | 10/2002 |

OTHER PUBLICATIONS

Andrew R. Rouse et al.: "Multispectral imaging with a confocal microendoscope", XP-000981049, Optics Letters, vol. 25, No. 23, Dec. 1, 2000, pp. 1708-1710.

D.H. Burns et al.: "Scanning Slit Aperture Confocal Microscopy for Three-Dimensional Imaging", XP000255795, Center for Bioengineering, University of Washington, Seattle, Washington, Scanning vol. 12, 1990, pp. 156-160.

James B. Pawley: Handbook of Biological Confocal Microscopy, 2$^{nd}$ Edition, 1995, Plenum Press, New York, pp. 1-17, and 19-37.

* cited by examiner

PRIOR ART

SCANNING MICROSCOPE COMPRISING A CONFOCAL SLIT SCANNER FOR IMAGING AN OBJECT

The present invention relates to a scanning microscope for imaging an object, comprising a light source, a spectrally selective element that can be adjusted in an almost infinitely variable manner, a spectrally selective detection device that can be adjusted in an almost infinitely variable manner, an illumination beam path extending from the light source to the object, a detection beam path extending from the object to the detection device, whereby the spectrally selective element can be used to select light from the light source in order to illuminate the object, whereby the selected light from the light source that is reflected and/or scattered on the object can be masked out of the detection beam path by means of the spectrally selective element, whereby at least one wavelength range of the light extending along the detection beam path can be detected by means of the spectrally selective detection device.

BACKGROUND

The term scanning microscope as employed in the present invention refers to microscopes in which the object to be imaged is scanned with an illumination pattern. This scanning procedure is commonly carried out in a meandering pattern, so that the object is scanned with the illumination pattern in a manner that is similar, for example, to the way an electron beam is directed onto the screen of a cathode ray tube.

Particularly in biomedical applications, very special scanning microscopes, namely, confocal scanning microscopes, have been in use for quite some time now whenever there is a need for a better resolution along the optical axis than can be obtained with conventional incident-light or transmitted-light microscopes. Regarding the configuration and possibilities of use of confocal scanning microscopes, mention is hereby made, for example, of the literature reference titled "Handbook of biological confocal microscopy", editor: J. Pawley, Plenum Press, 1995.

Within the scope of German patent applications DE 43 30 347 A1 and DE 199 02 625 A1, a possibility was found of replacing the detection device of a conventional confocal scanning microscope with a spectrally selective detection device that can be adjusted in an almost infinitely variable manner. For this purpose, the inflexible color or interference filters positioned in front of the detectors of conventional confocal scanning microscopes are replaced through the use of an appropriate device for selecting and detecting at least two spectral regions of a light beam. Here, the light beam is first spectrally split by a prism, an optical diffraction grating or a hologram. Then, mirror diaphragms arranged so as to be movable are used to select a first spectral region from the light that has been spectrally split and this first spectral region is then detected by means of a first detector. The light that has not been selected and that strikes the mirror diaphragms is reflected for purposes of detection with a second detector. Hence, the devices described in German patent applications DE 43 30 347 A1 and DE 199 02 625 A1 disclose the possibility of dispensing with the filters that are positioned in front of the detectors and that are inflexible in terms of the possibility of spectral adjustment.

DE 199 06 757 A1 discloses an optical arrangement with which the dichroitic or multichroitic beam splitters of a confocal scanning microscope can be replaced. Here, for purposes of illuminating the object, a spectrally selective element that can be adjusted in an almost infinitely variable manner selects light that comes from the laser light source and that has at least one wavelength and the light that comes from the laser light source and that is reflected and/or scattered on the object is masked out of the detection beam path. An active optical component that can be actuated and that is configured, for example, in the form of an acousto-optical-tunable filter (AOTF) or an acousto-optical deflector (AOD) is employed as the spectrally selective element.

Particularly in the case of the confocal scanning microscopy of weakly fluorescent specimens, the light beam that serves to illuminate the object has an overly short dwell period per scanned object point. Consequently, as a rule, the signal-to-noise ratio of the detected object point is too small or, in fact, even unusable. Especially for physiological applications, there is a great need to examine living specimens. By nature, fast movements occur here and these can only be meaningfully detected if the detected images of the object can be recorded rapidly enough. Such a high detection speed normally likewise yields an insufficient signal-to-noise ratio of the detected image data.

SUMMARY OF THE INVENTION

Therefore, it is an object of the present invention to provide a scanning microscope with which an object can be detected with an improved signal-to-noise ratio, even at a high scanning speed.

The present invention provides a scanning microscope for imaging an object. The scanning microscope includes:
 a light source;
 a spectrally selective detection device;
 an illumination beam path extending from the light source to the object;
 a detection beam path extending from the object to the detection device, at least one wavelength range of light extending along the detection beam path being detectable using the spectrally selective detection device;
 a spectrally selective element useable to select light from the light source so as to illuminate the object, the spectrally selective element being useable to mask out of the detection beam path the selected light from the light source reflected or scattered on the object;
 an illumination slit diaphragm disposed in the illumination beam path and configured to generate a linear illumination pattern in a region of the object; and
 a detection slit diaphragm disposed in the detection beam path and configured to detect the light coming from the linear illumination region from a focal plane so as to provide a confocal slit scanner;

wherein at least one of a slit length and a slit width of at least one of the illumination slit diaphragm and the detection slit diaphragm are variably settable.

It has been recognized according to the invention that a parallelization of the scanning procedure using a scanning microscope results in a longer dwell period of the illumination beam path on the object, so that each object point can undergo detection for a longer period of time. This, in turn, yields an increased signal-to-noise ratio of the light that is coming from the object and that is detected with the detection device. The parallelization of the object detection is provided by configuring the illumination beam path and the detection beam path in the form of a confocal slit scanner.

In conventional scanning microscopes, the spectrally selective element that can be adjusted in an almost infinitely variable manner as well as the spectrally selective detection device that can be adjusted in an almost infinitely variable manner are used merely as a confocal scanning microscope in the form of a point scanner, that is to say, the object is scanned point-by-point and the spectrally selective element and the spectrally selective detection device act upon a punctiform light beam. The spectrally selective element as well as the spectrally selective detection device, however, can also act upon a linear light beam in a comparable manner, so that these components can also constitute a scanning microscope in the form of a confocal slit scanner.

In the case of a confocal slit scanner, the object is illuminated with a linear illumination pattern in the focal plane of the microscope objective of the scanning microscope. Then, in a special embodiment of the detection beam path, the only light coming from the object that is actually detected is the light coming from the linearly illuminated object region, for instance, from the focal plane of the microscope objective. A confocal slit scanner has a confocality in a direction crosswise to the linear object illumination. There is virtually no confocality in the direction of the linear object illumination. However, as a result of the line-wise or row-wise scanning of the object—in comparison to row-by-row point-by-point scanning of the object—a longer illumination and detection time is achieved per object point at the same image rate. As a result, even weakly fluorescent or living specimens can be detected especially advantageously at an improved signal-to-noise ratio.

In a concrete embodiment, an illumination slit diaphragm is provided in the illumination beam path. This illumination slit diaphragm is preferably arranged in a plane corresponding to the focal plane of a microscope objective, so that, on the illumination side, the illumination slit diaphragm is imaged into the focal plane of the microscope objective of the scanning microscope, thus generating a linear illumination pattern in the object region. In order to scan the object, this linear illumination pattern can be moved relative to the object, for example, by means of a swiveling mirror positioned in the illumination beam path, in that said mirror is appropriately tilted around a pivot that lies in the entrance pupil of the microscope objective.

A detection in the manner carried out with a confocal slit scanner could be achieved in that a detection slit diaphragm is provided in the detection beam path. This detection slit diaphragm is preferably arranged in the detection beam path in a plane corresponding to the focal plane of the microscope objective. In other words, the microscope objective images the object positioned in its focal plane with the additional optical system that might be present in the detection beam path between the microscope objective and the detection slit diaphragm, said object being imaged onto the plane in which the detection slit plane is located. The detection slit plane is arranged in the plane that corresponds to the focal plane of the microscope objective in such a way that the only light coming from the object that can pass through the detection slit diaphragm is the light that comes from the linear illumination area from the focal plane of the microscope objective. Hence, this constitutes a confocal arrangement in terms of the illumination slit diaphragm and of the detection slit diaphragm.

It can be the case that, depending on the application, it might be necessary to vary the shape of the illumination pattern. For instance, just part of the totally imageable focal plane of the microscope objective could be detected, for example, in the form of a region-of-interest image. For this purpose, the length of the linear illumination pattern might have to be correspondingly shortened. Or else the width of the linear illumination pattern might have to be varied, as a result of which the resolution of the scanning microscope image is ultimately changed crosswise to the linear illumination pattern. To this end, it is provided that the length and/or the width of the slit of the illumination slit diaphragm and/or of the detection slit diaphragm can be variably set. Here, the length and the width are preferably varied independently of each other, that is to say, at a certain slit length, only the slit width of the illumination slit diaphragm and/or of the detection slit diaphragm can be variably set. A confocal image is always ensured if both the illumination slit diaphragm and the detection slit diaphragm are changed in the same way when the slit length and/or the slit width are varied.

In a concrete case, the illumination slit diaphragm and/or the detection slit diaphragm could comprise diaphragms that are arranged moveably. For instance, a feasible arrangement is one with four rectangular diaphragms, each of which can be moved or slid in a given direction, preferably by means of a motor. One of the sides or edges of two of the diaphragms could be arranged so as to lie parallel to each other in one plane, whereby the illumination or detection light can then pass between the two sides or edges of the diaphragm, in other words, the slit is formed in one direction. One of the sides or edges of the other two diaphragms could be oriented perpendicular thereto and be arranged essentially in the same plane so that the two other diaphragms delimit the slit along the direction that runs perpendicular thereto. Such an arrangement with four diaphragms makes it possible to vary the slit length independently of any variation in the slit width of the illumination slit diaphragm and/or of the detection slit diaphragm.

The slit length and/or the slit width could also be varied by means of a variable-focus optical system associated with each illumination slit diaphragm and/or detection slit diaphragm. In this context, the variable-focus optical system is arranged in the illumination or detection beam path in such a way that the effective slit width and/or the effective slit length of the corresponding slit diaphragm can be varied.

In a concrete case, this could be a zoom optical system that changes the overall enlargement of the illumination or detection beam path of the appertaining diaphragm to the object. Under certain circumstances, a variable-focus optical system can be employed as a pre-configured module in the corresponding beam path, so that advantageously a mechanical adjustment of individual diaphragm parts is not necessary.

The spectrally selective element comprises an active optical component that can be actuated. Consequently, provided that the appropriate actuation is present, it can then be adjusted in an almost infinitely variable manner. As a matter of principle, all of the embodiments of a spectrally selective element disclosed in DE 199 06 757 A1 can be employed for the scanning microscope according to the present invention, so that the disclosures contained in DE 199 06 757 A1 are explicitly included here and are thereby considered to be known. Two AOTF crystals may be provided as the spectrally selective element, whereby one of them forms the active optical component that is exposed to an appropriate ultrasound wave. The other AOTF crystal is arranged as an optically inactive component behind the first AOTF crystal in the detection beam path, and in fact, it is arranged in such a way that it reverses a spectral splitting of the luminescent light coming from the luminescent object as well as a separation of the different polarization directions caused by the first AOTF crystal. For this purpose, the second AOTF crystal is positioned so as to be rotated by 180° relative to the longitudinal axis of the first AOTF crystal. In another embodiment, the second AOTF crystal is likewise exposed to an ultrasound wave. In this arrangement, the crystal serves to further suppress the residual light that was not effectively reflected by the first AOTF crystal.

The spectrally selective detection device comprises means to spectrally split the light extending along the detection beam path. Preferably, this means is configured in the form of a prism. As an alternative, an optical diffraction grating or a hologram could be provided. Furthermore, the spectrally selective detection device comprises, on the one hand, means for selecting a first spectral region for purposes of detection with a first detector and, on the other hand, means for reflecting at least part of the unselected spectral region for purposes of detection with a second detector. In this manner, the light extending along the detection beam path first passes through the means for spectral splitting, which is configured, for example, in the form of a prism, and then—now spectrally split or spatially fanned out—strikes the means for selecting a first spectral region. The part of the spectrally split light that strikes the means that serves to reflect at least part of the unselected spectral region is reflected to a second detector. Therefore, the spectrally selective detection device could be configured according to the embodiments known from German patent applications DE 43 30 347 A1 and DE 199 02 625 A1. In this context, the disclosures contained in these German patent applications are explicitly included here and are thereby considered to be known.

If the means for selecting the first spectral region or the means for reflecting at least part of the unselected spectral region are realized by movably arranged diaphragms, slit diaphragms and/or mirror diaphragms, whereby the sliding or mechanical adjustment can take place at least virtually continuously, this constitutes a spectrally selective detection device that can be adjusted in an almost infinitely variable manner.

In a preferred embodiment, the detection device has a flat or linear detector. This detector has a spatial resolution corresponding to its flat or linear shape. In this manner, the flat or linear detector can all at once detect the detection light that is passing the detection slit diaphragm and that has been spectrally split and selected. In the case of a flat detector, the spatial information about the scanned object is detected in one direction, namely, parallel to the longitudinal side of the detection slit diaphragm. Perpendicular thereto, the spectral component of the detection light that was spatially fanned out by the means for spectral splitting is detected for each imaged object point.

In a concrete case, the detector could comprise a CCD element that is configured in the form of a CCD array or CCD chip—in other words, a flat CCD element—or a line photomultiplier or a CCD line—in other words, a linear CCD element—or as a CMOS element in combination with an image amplifier.

If the shape of the light beam of the spectral region to be detected has to be adapted to the detector shape, thus, for instance, flat or linear, then an adaptation optical system could be arranged in front of a detector of the detection device. This could be a lens or a lens arrangement that produces an enlargement or reduction or another image. Preferably, the adaptation optical system is configured so as to be variable, for example, in the form of a zoom optical system. Consequently, in an advantageous manner, a light beam having smaller spatial dimensions could be enlarged to the full surface area or line of the flat or linear detector.

Especially when a linear detector is used to detect the detection light, it is advantageous for a means for recombining the light to be positioned in the detection beam path in front of a detector of the detection device, said means generating an essentially linear or focused light beam. The means for recombining the light reverses, at least for the most part, the spectral splitting or spatial fanning out caused by the means for spectral splitting of the spectrally selective detection device or else focuses at least the spectrally fanned out light onto a line that can be detected by the linear detector.

The means for recombining the light could be a lens, a prism, an optical diffraction grating or a hologram. If the means for recombining the light comprises a lens, then the spatially fanned out light beam is merely focused onto a line; with just one lens, the spectral splitting is not completely reversed in any case. With an appropriately arranged prism, optical diffraction grating or optical module having a hologram, however, the spectral splitting by the means for spectral splitting of the detection device could be virtually completely reversed, so that the spectrally fanned out light beam is converted by means of the means for recombining the light into a linear light beam that can then be detected by the linear detector.

Particularly in the case of fluorescent lifetime applications or photon-counting applications, the detector of the detection device could exhibit a read-out rate in the µs or ns range. Line-wise or row-wise detectors, which have corresponding read-out rates, are known from the state of the art and are employed especially for the above-mentioned applications, for the time-related resolution of the decay behavior of luminescence specimens as well as for gas-injection experiments in explosion chambers.

In particular, the detector of the detection device could have an activation unit that allows a time-related activation and deactivation of the detector. Such an activation unit is realized for CCD arrays or CCD chips or CMOS amplifiers with read-out rates in the ns range by means of time-gate circuitry, which allows the detector to detect within a predefineable window of time.

In an embodiment, the scanning microscope is configured in the form of a multi-photon microscope. Accordingly, the object or a marker that serves to mark the object can be excited with the methods of multi-photon excitation and then detected. Therefore, a suitable light source is to be provided for this purpose, for example, a laser light source that emits a pulsed light in the near infrared spectrum. Normally, a titanium-sapphire laser is employed for this purpose. Moreover, the spectrally selective element as well as the spectrally selective detection device are to be set in such a way that, for instance, a two-photon fluorescence excitation takes place with light having a wavelength in the range from 720 nm to 1000 nm and this excited fluorescent light is detected in the range from 400 nm to 600 nm. The pulse duration of the light emitted by the titanium-sapphire laser preferably lies in the ps range. Aside from the two-photon fluorescence, other nonlinear effects in the specimen can also be generated and detected such as, for example, the generation of higher harmonic, for instance, second or third harmonic generation, or else CARS (Coherent Anti-Stokes Raman Scattering).

BRIEF DESCRIPTION OF THE DRAWINGS

There are, of course, many possibilities to advantageously configure and refine the teaching of the present invention. Generally preferred embodiments and refinements of the invention will be presented in conjunction with the explanation of the preferred embodiments of the invention, making reference to the drawings. The drawing shows the following.

DETAILED DESCRIPTION

Figure 1:
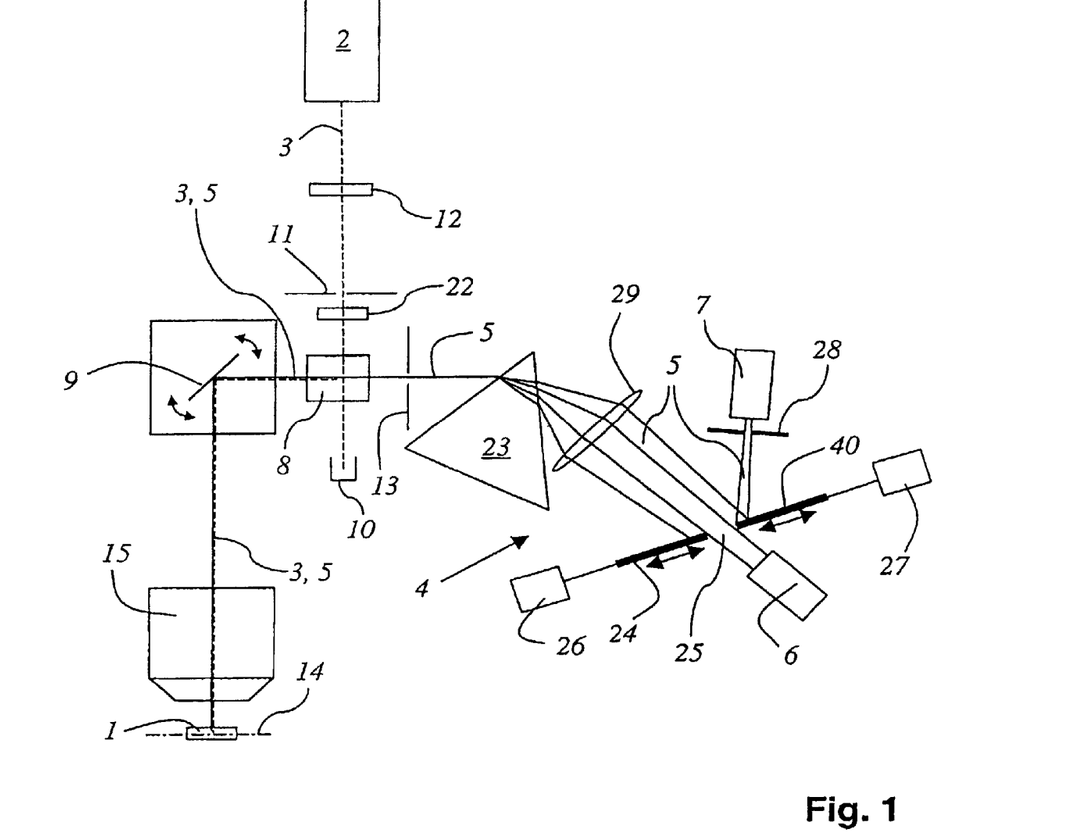
FIG. 1 a schematic depiction of a first embodiment of a scanning microscope according to the invention for imaging an object.

FIG. 1 shows a scanning microscope for imaging an object 1. The scanning microscope comprises a light source 2 that serves to illuminate the object 1. The illumination beam path 3 extends from the laser light source 2 to the object 1. The scanning microscope also comprises a spectrally selective detection device 4 that can be adjusted in an almost infinitely variable manner and that detects at least one wavelength range of the light extending along the detection beam path 5. The detection beam path 5 extends from the object 1 all the way to the detectors 6 and 7. The spectrally selective element 8 selects light from the laser light source 2 in order to illuminate the object in that it reflects light having a certain wavelength towards the scanning device 9. The unselected light of the laser light source 2—for example, having other wavelengths—passes through the spectrally selective element 8 and is absorbed in the beam trap 10. The light from the laser light source 2 that is reflected and/or scattered on the object 1 is likewise masked out of the detection beam path 5 by the spectrally selective element 8 and deflected in the direction of the laser light source 2.

According to the invention, the illumination beam path 3 and the detection beam path 5 are configured in the form of a confocal slit scanner. This can be seen particularly clearly in the perspective view of the embodiment shown in FIG. 2.

FIG. 1 shows that an illumination beam slit diaphragm 11 is provided in the illumination beam path 3. The light beam emitted by the laser light source 2 is transformed by the lens 12 into a linear light beam that passes—at least for the most part—through the illumination beam slit diaphragm 11. FIG. 1 only shows the optical axis of the linear beam path; the illumination beam path 3 and the detection beam path 5 have a linear cross section that is positioned perpendicular to the plane of the drawing.

In the detection beam path 5, there is a detection slit diaphragm 13 that is arranged so that, on the one hand, it corresponds to the focal plane 14 of the microscope objective 15 and, on the other hand, it corresponds to the illumination slit diaphragm 11.

Figure 2:
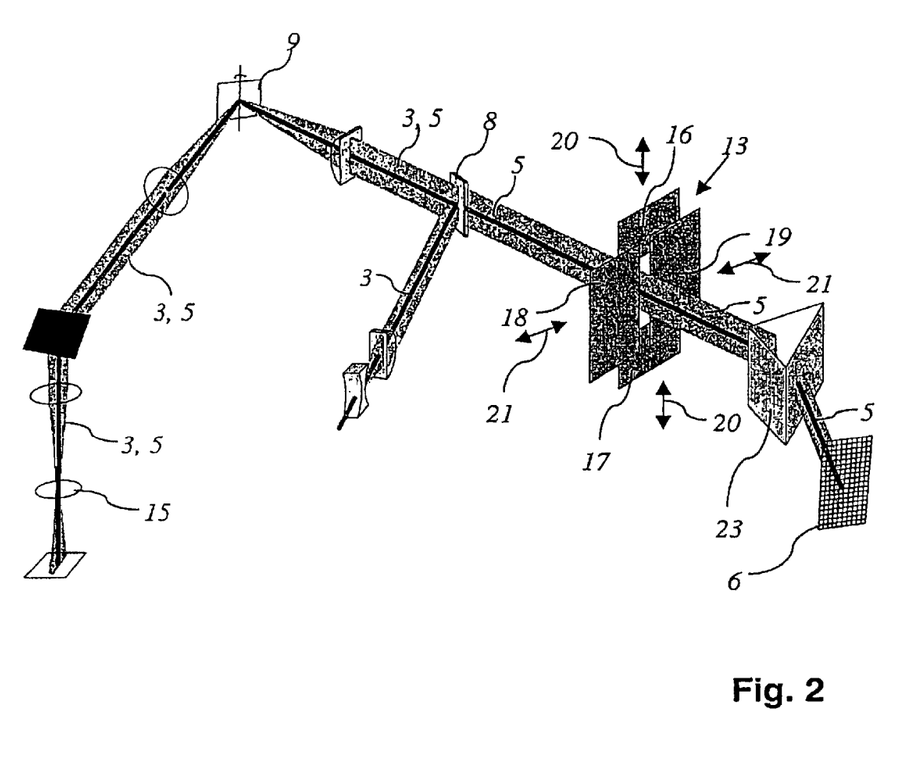
FIG. 2 a schematic depiction of a second embodiment of a scanning microscope according to the invention for imaging an object.
Figure 3:
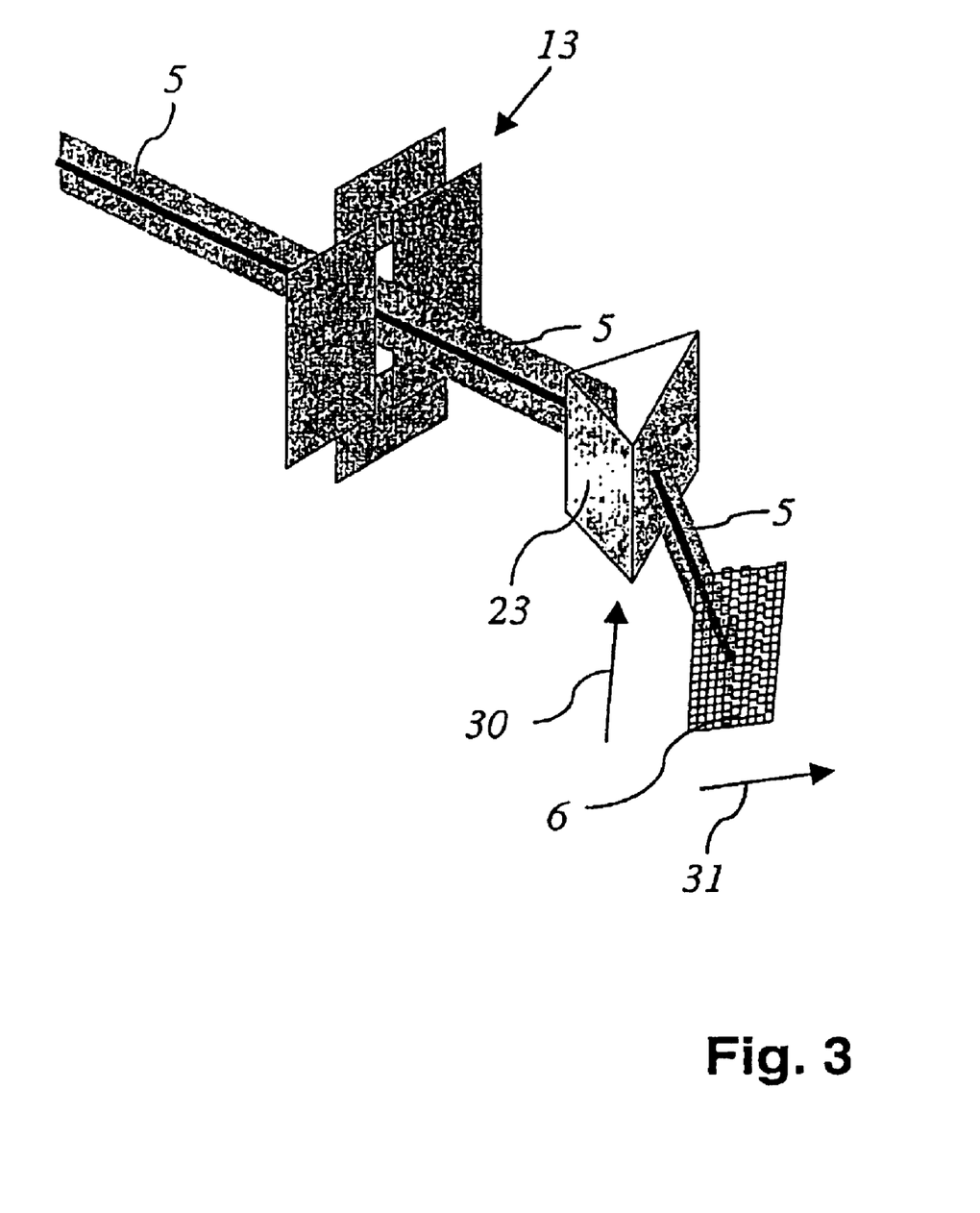
FIG. 3 a schematic depiction of a section of the embodiment according to FIG. 2, in a perspective view.

Both the slit length and the slit width of the detection slit diaphragm 13 can be adjusted variably, which is indicated in FIGS. 2 and 3. In this context, the detection slit diaphragm 13 comprises four diaphragms 16 to 19 that are arranged movably. In each case, one of the sides or edges of the diaphragms 16 to 19 forms the slit of the detection slit diaphragm 13. The diaphragms 16 and 17 can be moved along the directions indicated by the double-headed arrows 20. The diaphragms 18 and 19 can be moved along the directions indicated by the double-headed arrows 21. In this manner, the diaphragms 18 and 19 can be used to vary the slit width of the detection slit diaphragm 13, while the slit length of the detection slit diaphragm 13 can be varied with the diaphragms 16 and 17.

FIG. 1 shows that, between the illumination slit diaphragm 11 and the spectrally selective element 8, there is a variable-focus optical system 22 with which the effective slit width and the effective slit length of the illumination slit diaphragm 11 can be varied. The variable-focus optical system 22 is configured in the form of a zoom-lens arrangement 3 which varies the overall enlargement factor of the illumination beam path 3—together with the microscope objective 15—and thus generates a larger or smaller image of the illumination slit diaphragm 11 in the focal plane 14 of the microscope objective 15.

The spectrally selective detection device 4 shown in FIGS. 1 to 4 comprises a means 23 for spectrally splitting the light extending along the detection beam path 5. The means 23 is configured in the form of a prism. Furthermore, the detection device 4 shown in FIGS. 1 and 4 comprises the means 24 and 40 for selecting a first spectral region 25. The light of the first spectral region 25 coming from object 1 and selected by the means 24 and 40 is detected with the detector 6. The means 24 is a diaphragm arranged such that it can be moved by the motor 26 along the direction indicated by the double-headed arrow drawn on the means 24.

The means 40 is a mirror diaphragm arranged such that it can be moved by the motor 27 along the direction indicated by the double-headed arrow drawn on the means 40. The light reflected on the means 40 is the spectral fraction of the light that is spectrally split by the means 23, that comes from object 1 and that is not selected for the first detector 6. This light passes—at least for the most part—through the means 28 for selecting the reflected spectral region and it is then detected with the detector 7. The lens 29 shown in FIGS. 1 and 4 collimates or focuses the light spectrally split by the means 23 onto the plane in which the means 24 and 40 for selecting the first spectral region it is arranged.

In perspective views, FIGS. 2 and 3 illustrate that the detection device 4 has a flat detector 6. The flat detector 6 has a spatial resolution that corresponds to its flat shape. The flat detector 6 is configured in the form of a CCD array or a CCD chip. FIG. 3 shows an enlarged view of part of the detection device 4. Here, it is schematically shown that the spatial information of the light coming from object 1 can be detected in the direction 30 along the linear illumination pattern. The spectral information of each detected object point along the direction 31 is imaged on the detector 6. For the sake of clarity, lenses and other optical means needed for directing and shaping the light have been omitted from the figures.

The detector 6 configured as a CCD array and shown in FIGS. 2 and 3 has a read-out speed of 100 images per second. With an object image size of 512×512 pixels, a read-out has to be performed 512 times in order to obtain a complete object image recording by the detector 6. This results in a total imaging duration of approximately 5 seconds for one object image. The scanning speed of the scanning device 9 is synchronized or adapted to the read-out speed of the detector 6. Therefore, the spatial information as well as the spectral information of each image point is available as an object representation of an object 1 that has been scanned once—at the above-mentioned image size of 512×512 pixels.

Figure 4:
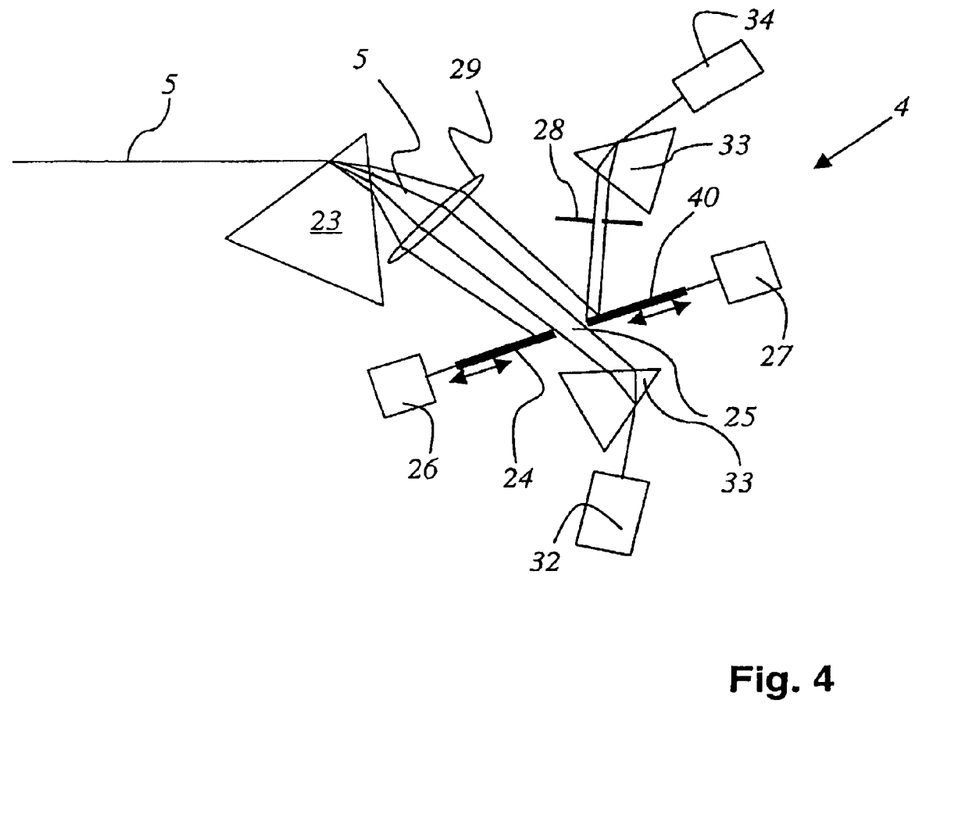
FIG. 4 a schematic depiction of part of a detection device of another embodiment.

FIG. 4 shows another embodiment of a detection device 4 in which a means 33 for recombining the light that passes through the means 24, 40 for selecting the first spectral region 25 is arranged between the means 24, 40 for selecting a first spectral region 25 and the detector 32. The means 33 for recombining the light is configured in the form of a prism and generates a linear light beam that is detected by the detector 32 that is configured as a CCD line. In the same manner, a means 33 for recombining the light extending there is arranged between the means 28 for selecting the reflected spectral region and the detector 34, so that the means 33 for recombining the light likewise generates a linear light beam that is detected with the linear detector 34 that is configured in the form of a CCD line.

Figure 5:
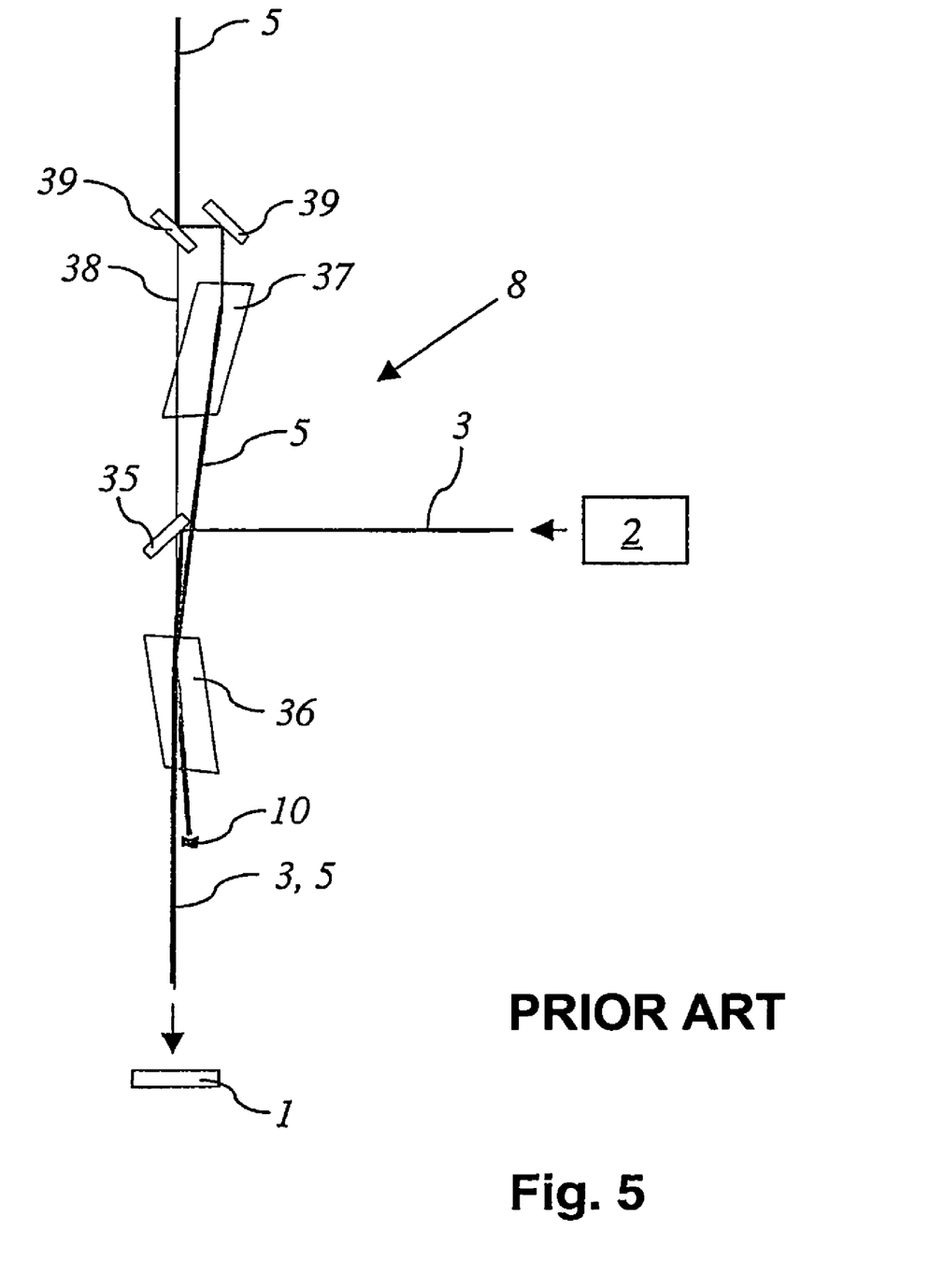
FIG. 5 a schematic depiction of an embodiment of a spectrally selective element known from the state of the art.

FIG. 5 shows a detailed enlargement of a spectrally selective element 8 according to the prior art. The light beam—whose cross section is punctiform—of the light from the laser light source 2 strikes a mirror 35 that reflects the light into a first AOTF crystal 36. If the AOTF crystal 36 is set in such a way that no light from the laser light source 2 is selected for illuminating the object, this light passes through the first AOTF crystal 36 in such a manner that it is completely absorbed by the beam trap 10. If the first AOTF crystal 36 is set in such a way that, for example, light having a certain wavelength is selected for illuminating the object, then this light is deflected as it passes through the first AOTF crystal 36—with first-order diffraction—so that it enters the illumination beam path 3 and is used to illuminate the object, which is indicated by the lower arrow on object 1. The selected light from the laser light source 2 that is reflected and/or scattered on the object passes through the first AOTF crystal 36 in the opposite direction, then striking—with first-order diffraction—the mirror 35 that reflects towards the laser light source 2 the reflected and/or scattered light coming from the object. The fluorescent light coming from object 1 passes through the first AOTF crystal 36 with zero-order diffraction and passes through the mirror 35 to the second AOTF crystal 37. The AOTF crystal 37 is positioned so as to be rotated by 180° around the schematically indicated—optical—axis 38. In this manner, the second AOTF crystal 37 reverses the spectral splitting by the first AOTF crystal 36 of the fluorescent light as well as the polarization separation. The two mirrors 39 serve merely to coaxially bring the light that passes through the AOTF crystals 36, 37 back to the optical axis 38.

Figure 6:
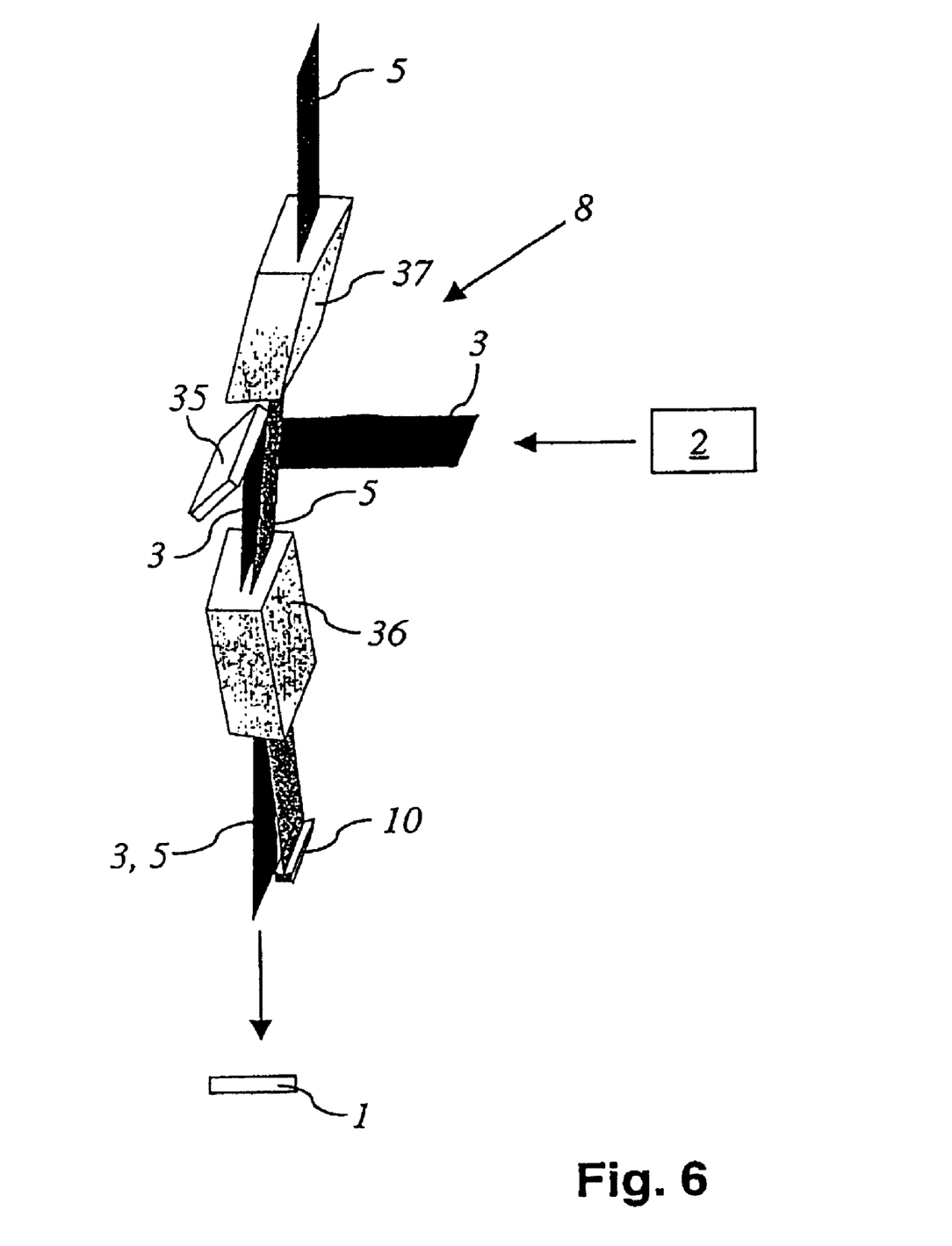
FIG. 6 a schematic depiction of an embodiment of a spectrally selective element according to the present invention, in a perspective view.

FIG. 6 shows a perspective view of the principle of functioning of the spectrally selective element 8 for the confocal scanning microscope according to the invention that works in the form of a confocal slit scanner. Here, a light beam that has a linear cross section and that comes from the laser light source 2 is reflected by the mirror 35 to the first AOTF crystal 36. The rest of the principle of functioning of the spectrally selective element 8 shown in FIG. 6 is essentially the same as that of the spectrally selective element 8 shown in FIG. 5, whereby the part of the illumination beam path 3 shown in FIG. 6 as well as the part of the detection beam path 5 likewise shown there each have a linear cross section.

Finally, special mention should be made of the fact that the embodiments explained above serve merely to describe the teaching being claimed and should not be construed as a limitation to these embodiments.

The invention claimed is:

1. A scanning microscope for imaging an object, comprising:
    a light source;
    a spectrally selective detection device;
    an illumination beam path extending from the light source to the object;
    a detection beam path extending from the object to the detection device, at least one wavelength range of light extending along the detection beam path being detectable using the spectrally selective detection device;
    a spectrally selective element useable to select light from the light source so as to illuminate the object, the spectrally selective element being useable to mask out of the detection beam path the selected light from the light source reflected or scattered on the object;
    an illumination slit diaphragm disposed in the illumination beam path and configured to generate a linear illumination pattern in a region of the object;
    a detection slit diaphragm disposed in the detection beam path and configured to receive light coming from the linear illumination region from a focal plane so as to provide a confocal slit scanner; and
    a spectral splitting device configured to spectrally split the light extending along the detection beam path so as to provide spectrally split light including spatial information along a first direction and spectral information along a second direction;
    wherein at least one of a slit length and a slit width of at least one of the illumination slit diaphragm and the detection slit diaphragm are variably settable.

2. The scanning microscope as recited in claim 1 wherein at least one of the illumination slit diaphragm and the detection slit diaphragm includes a moveably arranged first diaphragm side.

3. The scanning microscope as recited in claim 2 wherein at least one of the illumination slit diaphragm and the detection slit diaphragm includes a moveably arranged second diaphragm side, the first and second diaphragm sides together forming at least one of the illumination slit diaphragm and the detection slit diaphragm.

4. The scanning microscope as recited in claim 1 further comprising a variable-focus optical system associated with at least one of the illumination slit diaphragm and the detection slit diaphragm and configured to vary at least one of a respective effective slit length and a respective effective slit width of at least one of the illumination slit diaphragm and the detection slit diaphragm.

5. The scanning microscope as recited in claim 1 wherein the spectrally selective element includes an actuatable active optical component.

6. The scanning microscope as recited in claim 5 wherein the active optical component includes at least one of an acousto-optical tunable filter and an acousto-optical deflector.

7. The scanning microscope as recited in claim 1 wherein the spectrally selective detection device includes:
    a selection device configured to select a first spectral region for detection using a first detector of the detection device; and
    a reflecting device configured to reflect at least a part of a non-selected spectral region for detection with a second detector of the detection device.

8. The scanning microscope as recited in claim 7 wherein the spectral splitting device includes a prism.

9. The scanning microscope as recited in claim 1 wherein the detection device includes a flat two dimensional detector having a spatial resolution corresponding to a respective flat shape of the detector.

10. The scanning microscope as recited in claim 9 wherein the detector includes a CCD element including a CCD array.

11. The scanning microscope as recited in claim 10 further comprising an adaptation optical system disposed in the detection beam path upstream of a detector of the detection device and configured to adapt a spectral region to be detected to a shape of the detector.

12. The scanning microscope as recited in claim 11 wherein the adaptation optical system is variable.

13. The scanning microscope as recited in claim 1 further comprising a CCD-line and a light recombining device disposed in the detection beam path upstream of the detector and configured to generate at least one of a substantially linear and a focused light beam.

14. The scanning microscope as recited in claim 13 wherein the light recombining device includes at least one of a lens, a prism, an optical diffraction grating and a hologram.

15. The scanning microscope as recited in claim 1 wherein the detection device includes a detector having a read-out rate in a µs or ns range so as to enable at least one of a lifetime experiment and a decay behavior of a luminescence specimen to be time-resolved.

16. The scanning microscope as recited in claim 15 wherein the lifetime experiment is a fluorescent lifetime experiment.

17. The scanning microscope as recited in claim 1 wherein the detection device includes a detector having an activation unit that allows a time-related activation and deactivation of the detector.

18. The scanning microscope as recited in claim 1 wherein the light source is configured to provide a multi-photon excitation of at least one of the object and a marker configured to mark the object.

* * * * *